United States Patent [19]
Loibl

[11] Patent Number: 5,909,391
[45] Date of Patent: Jun. 1, 1999

[54] METHOD FOR STORING DATA IN MEMORY

[75] Inventor: Josef Loibl, Regen, Germany

[73] Assignee: Siemens Aktiengesellschaft, Munich, Germany

[21] Appl. No.: 08/883,032

[22] Filed: Jun. 26, 1997

[30] Foreign Application Priority Data

Jun. 26, 1996 [DE] Germany .......................... 196 25 619

[51] Int. Cl.$^6$ .................................................. G11C 5/02
[52] U.S. Cl. ................... 365/185.08; 365/185.14
[58] Field of Search .................. 365/185.08, 185.14, 365/63; 126/21; 172/2

[56] References Cited

U.S. PATENT DOCUMENTS 4,510,584 4/1985 Dias et al. ...................... 365/185.08
5,737,258 4/1998 Choi et al. ................................ 365/63

FOREIGN PATENT DOCUMENTS

3541114A1 5/1987 Germany .

OTHER PUBLICATIONS

Japanese Patent Abstract No. 5–314754 (Maekawa et al.), dated Nov. 26, 1993.

Primary Examiner—David Nelms
Assistant Examiner—David Lam
Attorney, Agent, or Firm—Herbert L. Lerner; Laurence A. Greenberg

[57] ABSTRACT

A method for storing data in memory, in particular adaptation data, includes reading the data out of a first, volatile memory and storing the data in a second, nonvolatile memory. The frequency with which data are stored in the second memory, in particular an EEPROM, is reduced by providing that the data are written in alternation into at least two different memory regions. Moreover, a storage operation of the data occurs only at predetermined time intervals and at a speed of the motor vehicle that is below a predeterminable limit speed. Preferably, a storage operation is performed only when the temperature of the second memory is below a limit temperature.

12 Claims, 3 Drawing Sheets

5,909,391

METHOD FOR STORING DATA IN MEMORY

BACKGROUND OF THE INVENTION

FIELD OF THE INVENTION

The invention relates to a method for storing data, in particular adaptation data, in memory, in which the data are read out of a first, volatile memory and stored in a second, nonvolatile memory.

In order to execute control programs, a control unit requires data, in particular control data, which are written into a read only memory (ROM) as basic data, for instance by a motor vehicle manufacturer. During the service life of a control unit, the operating parameters of the apparatus, in particular the internal combustion engine, to be controlled by the control unit vary, so that data are ascertained on an ongoing basis and stored in a memory as adaptation data, which are then accessed instead of the basic data by the control unit. In this way, it becomes possible to adapt the control programs to changes in the operating parameters of the apparatus to be controlled.

It is already known to store the adaptation data in alternation in various memory regions. Each time data are stored in a predetermined memory region in a backup data block, backup data are stored, and the backup data stored in the previous storing operation are erased. The more often the data are stored, the greater is the likelihood that an error will occur upon storage in the memory.

SUMMARY OF THE INVENTION

It is accordingly an object of the invention to provide a method for storing data in memory, which overcomes the hereinafore-mentioned disadvantages of the heretofore-known methods of this general type and which avoids defective storage of data, especially adaptation data of a control unit.

With the foregoing and other objects in view there is provided, in accordance with the invention, a method for storing data in memory, in particular adaptation data, which comprises reading data out of a first, volatile memory; and storing the data in alternation in a first memory region and in at least one second memory region of a second, nonvolatile memory.

In accordance with another mode of the invention, there is provided a method which comprises storing the data in cyclical order in the second memory.

In accordance with a further mode of the invention, there is provided a method which comprises storing the data in the memory region which has not been written into for the longest time and thus has the oldest data.

In accordance with an added mode of the invention, there is provided a method which comprises storing backup data in alternation with the data in the first or second memory region of the second memory, upon each storage operation for the data.

In accordance with an additional mode of the invention, there is provided a method which comprises incrementing a counter of the memory region in which the data has been stored to a value representing a highest value of a counter of the memory regions.

In accordance with yet another mode of the invention, there is provided a method which comprises storing the data only after a predeterminable length of time has elapsed since the last storage operation.

In accordance with yet a further mode of the invention, there is provided a method which comprises performing a storage operation only whenever a speed at which the second memory is moved is below a predeterminable limit speed.

In accordance with yet an added mode of the invention, there is provided a method which comprises permitting a storage operation only if a temperature of the second memory is below a predeterminable limit temperature.

In accordance with yet an additional mode of the invention, there is provided a method which comprises initializing a control unit by searching for the memory region of the second memory in which data have most recently been written and in which a check of backup data indicates a correct storage operation; writing the data of the memory region into the first memory; and using the data written into the first memory by the control unit for executing a control process.

In accordance with again another mode of the invention, there is provided a method which comprises, for the storage operation, using a memory region having an invalid plausibility detector for the storage operation or writing the data into a memory region into which no data has been written for the longest time and which thus has the oldest adaptation data if no memory region with an invalid plausibility detector is present.

With the objects of the invention in view, there is also provided a method for storing data in memory, in particular adaptation data, which comprises reading the data out of a first, volatile memory; and storing the data in a second, nonvolatile memory only if a vehicle in which the second memory is located is moving more slowly than a predeterminable speed.

With the objects of the invention in view, there is additionally provided a method for storing data in memory, in particular adaptation data, which comprises reading the data out of a first, volatile memory; and storing the data in a second, nonvolatile memory only if a temperature of the second memory is below a predeterminable limit temperature.

The attainment of the object has the advantage of reducing the number of storage operations for a memory region, which reduces the likelihood that an error will occur. A further advantageous embodiment includes performing a storage operation only when the speed of the vehicle is below a limit speed. As a result, on one hand the number of storage operations is reduced, and on the other hand the adaptation data that are present in the volatile memory before a stop of the vehicle and therefore with corresponding likelihood before the vehicle is turned off, will predominantly be written into the nonvolatile memory. Therefore the next time that the vehicle is started, these adaptation data will be the most-current adaptation data and assure optimal adaptation of the control processes.

Other features which are considered as characteristic for the invention are set forth in the appended claims.

Although the invention is illustrated and described herein as embodied in a method for storing data in memory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
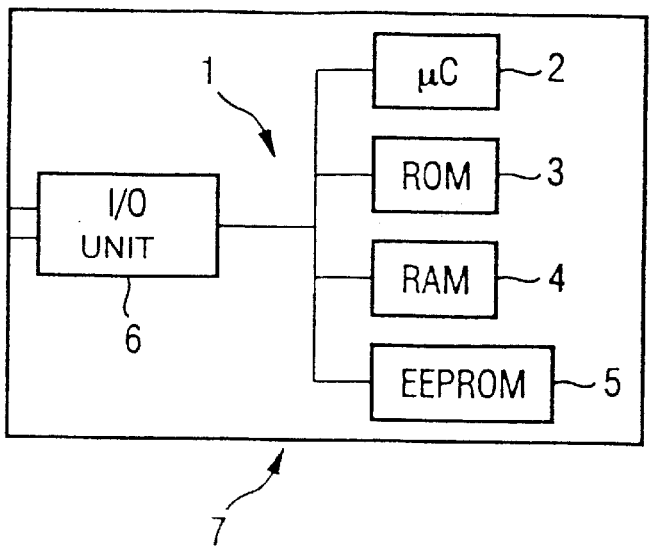
FIG. 1 is a block circuit diagram of a control unit.

Referring now to the figures of the drawings in detail and first, particularly, to FIG. 1 thereof, there is seen a control unit 7 which has an input/output unit 6 that is connected through a data bus 1 to an arithmetic unit 2, a first memory 4 which is constructed as a read/write memory (RAM), a second memory 5 which is constructed as a static read/write memory, in particular in the form of an EEPROM or a flash EPROM, and a third memory 3 which is constructed as a read-only memory (ROM).

Basic data are stored in the third memory 3, and during operation of the control unit 7, adaptation data are buffer-stored in the first memory 4 through the input/output unit 6 and transferred, as a function of various conditions, into the nonvolatile second memory 5, so that even after a supply voltage is switched off, the adaptation data remain stored in the second memory 5 and are not lost, although this would be the case in the first memory 4. The advantage in this case is that the control unit 7 can access the adaptation data again, even after the supply voltage is shut off and turned back on again. One application is, for instance, where the control unit 7 controls an internal combustion engine of a motor vehicle and the ignition is turned off and then turned back on again later.

The first memory 4 is constructed as a volatile read/write memory (RAM), and the second memory 5 is constructed as a static read/write memory (EEPROM), which keeps the stored data in memory even without any voltage supply. The first memory 4 loses the stored data when the supply voltage is turned off.

The third memory 3, which is constructed as a read-only memory (ROM), stores the basic data which the control unit 7 needs to calculate functions with which apparatuses of a motor vehicle, in particular the internal combustion engine, transmission, brake system, passenger-comfort electronics, and electrical steering can be triggered. The basic data are stored in the third memory 3 by the automobile manufacturer. When the motor vehicle is put into operation, the control unit 7 first accesses the basic data of the third memory 3, so that it can perform control processes for the apparatuses of a motor vehicle.

However, since the basic data can change over the service life of the vehicle, the basic data are adapted on an ongoing basis and stored in the first memory 4. In addition, since the first memory 4 only stores the data in volatile fashion, the adaptation data are copied at predetermined time intervals from the first memory 4 to the second memory 5, which permanently stores adaptation data 8.

In a preferred embodiment, the second memory 5 is constructed as a portion of the third memory 3 and forms a structural unit together with the third memory 3.

Figure 2:
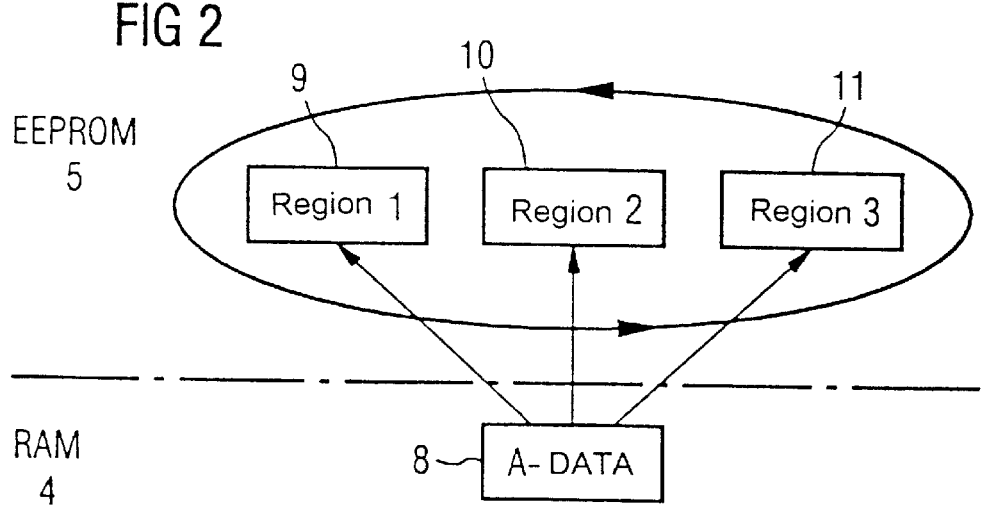
FIG. 2 is a schematic overview of a storage method.

FIG. 2 schematically shows a method for storing data in memory that have been copied from the first memory 4 into the second memory 5. The adaptation data (A-DATA) 8 are written in alternation into a first memory region 9, a second memory region 10, or a third memory region 11 of the second memory 5. The first, second and third memory regions 9, 10, 11 are physically separate memory regions.

Advantageously, the storage operation is performed cyclically, so that in sequence, the adaptation data 8 are written in the first memory region 9 in a first storage operation, in the second memory region 10 in a second storage operation, in the third memory region 11 in a third storage operation, and back in the first memory region 9 in a fourth storage operation, and so forth.

Figure 3:
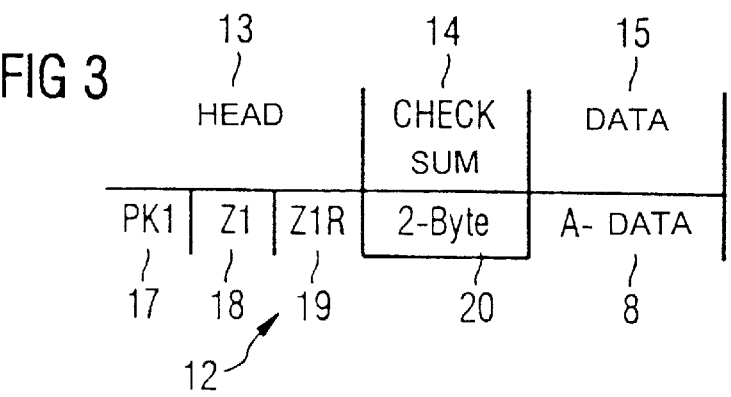
FIG. 3 is schematic view of a data block.

FIG. 3 schematically shows the structure of the data stored in memory. The data are stored in the form of a data block 12 in a memory region 9, 10, 11. The data block 12 has a data head 13, a check sum 14 and a data region 15. The data head 13 includes a plausibility detector PK1, 17; a counter Z1, 18; and a redundant counter Z1R, 19. The counter 18 is constructed as a first counter field which has a first counting value. The redundant counter 19 is constructed in the form of a second counter field which has a second counting value. The check sum 14 has a size of two bytes and represents a data train 20 that contains information as to whether or not the adaptation data 8 deposited in the data region 15 were deposited without error.

The plausibility detector 17 is set to nonvalid data before the adaptation data 8 from the first memory 4 are written into the second memory 5 and is then reset to valid data after the adaptation data 8 have been written in. In this way, an operation of storing the adaptation data 8 that is interrupted before its correct termination and thus before the plausibility detector is changed over to valid data, is immediately found invalid by checking the plausibility detector.

The counter 18 is incremented by one value after each storage operation of the adaptation data 8. According to a further mode of the invention, the counter 18 is incremented after the storage operation of the adaptation data 8 by a value higher than the highest counter 18 of another memory region 9, 10, 11. In this way the memory region 9, 10, 11 in which the adaptation data 8 have been written most recently has the counter 18 having the highest value, so that the memory region with the most recently written data is found by way of the counter 18. The redundant counter 19 is treated in the same way as the counter 18 and serves the purpose of plausibility comparison with the counter 18. If the counter 18 and the redundant counter 19 have a different counter state, this is an indication of invalid data in the data block 12.

According to a further mode of the invention, the counter 18 and the redundant counter 19 are constructed as overflow counters. Upon an overflow, the overflow is stopped, and the counter 18 that has the highest number of overflows and the highest counter value is recognized as the highest counter 18. If two counters 18 have the same number of overflows, then the counter 18 having the highest counter value is the highest counter. The redundant counter 19 is treated analogously to the counter 18.

The method for storing data in memory according to the invention will now be described in conjunction with FIG. 4. At a program point 20, the arithmetic unit 2 checks whether or not a predeterminable time period TM, for instance 10 minutes, has elapsed since the last time that the adaptation data 8 were copied from the first memory 4 into the second memory 5. If not, a return to the program point 20 is made. However, if at least a time period TM has elapsed since the last storage operation, then at a program point 21 a check is made as to whether or not the speed of the vehicle in which the second memory 5 is located is below a predetermined limit speed VG, for instance of 30 km/h. If the motor vehicle speed is lower than the limit speed VG, then according to a simple version of the invention, a jump to a program point 23 is immediately made, bypassing a program point 22.

According to a preferred embodiment of the invention, if the motor vehicle speed is lower than the limit speed VG, the program point 22 is executed. In the program point 22, the arithmetic unit 2 checks whether or not the temperature of the second memory 5 is below a predeterminable limit temperature TG. The predeterminable limit temperature is 120° C., for instance. If the temperature of the second memory 5 is not below the predeterminable limit temperature, then a jump back to the program point 20 is made. However, if the temperature of the second memory 5 is below the limit temperature TG, then a program point 23 is executed.

Figure 5:
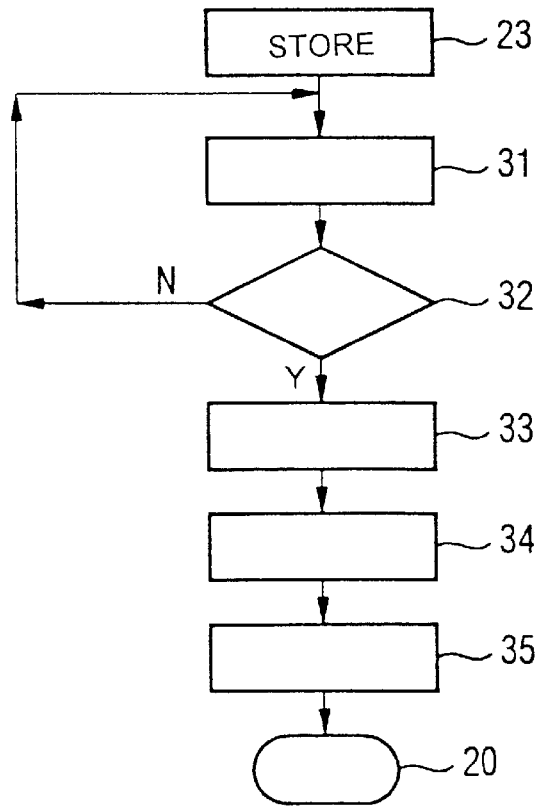
FIG. 5 is a more-specific schematic program sequence for storing the data in memory.

The program point 23 encompasses the transfer of the adaptation data 8 from the first memory 4 into the second memory 5 and is shown in more detail in FIG. 5.

FIG. 5 shows details of the program points that the program point 23 encompasses: in a program point 31, the arithmetic unit 2 searches for the memory region 9, 10, 11 in which the data block 12 is deposited and has a counter 18 with the lowest value and thus characterizes the data block 12 that contains the oldest adaptation data 8, or in other words the adaptation data that have not been updated for the longest time. This data block is referred to below as the current data block.

The current data block is subjected in a program point 32 to a plausibility check, in which the counter 18 is compared with the redundant counter 19. If the program point 32 shows that the counter 18 and the redundant counter 19 do not agree, then the current data block is identified as invalid, and a return is made to the program point 31. The data block found to be invalid is no longer taken into account in the program point 31.

If the plausibility check in the program point 32 shows that the counter 18 and the redundant counter 19 do agree, then in a program point 33 the plausibility detector 17 of the current data block 12 is set to invalid.

The arithmetic unit 2 thereupon stores the adaptation data 8, which are stored in the first memory 4, in the current data block 12 of the second memory 5. During the operation of the motor vehicle, the adaptation data 8 are written continuously into the first memory 4. In the program point 33, preferably only the most recent adaptation data 8 are transferred from the first memory 4 to the second memory 5. After the transfer of the adaptation data 8 from the first memory 4 to the second memory 5, the plausibility detector 17 of the current data block 12 is reset to valid in a program point 34, and then the counter 18 of the current data block 12 is incremented by one value in a program point 35.

Preferably, in the program point 35, the arithmetic unit 2 checks the counters 18 of all of the data blocks 12 that have been deposited in one of the memory regions 9, 10, 11, and ascertains which counter 18 is the highest. The arithmetic unit 2 thereupon sets the counter 18 of the current data block 12 to a value that is higher than the value of the highest counter. This assures that the data block 12 into which the adaptation data 8 have been written most recently has the counter 18 with the highest value. After the execution of the program point 35, a return is made to the program point 20.

Figure 6:
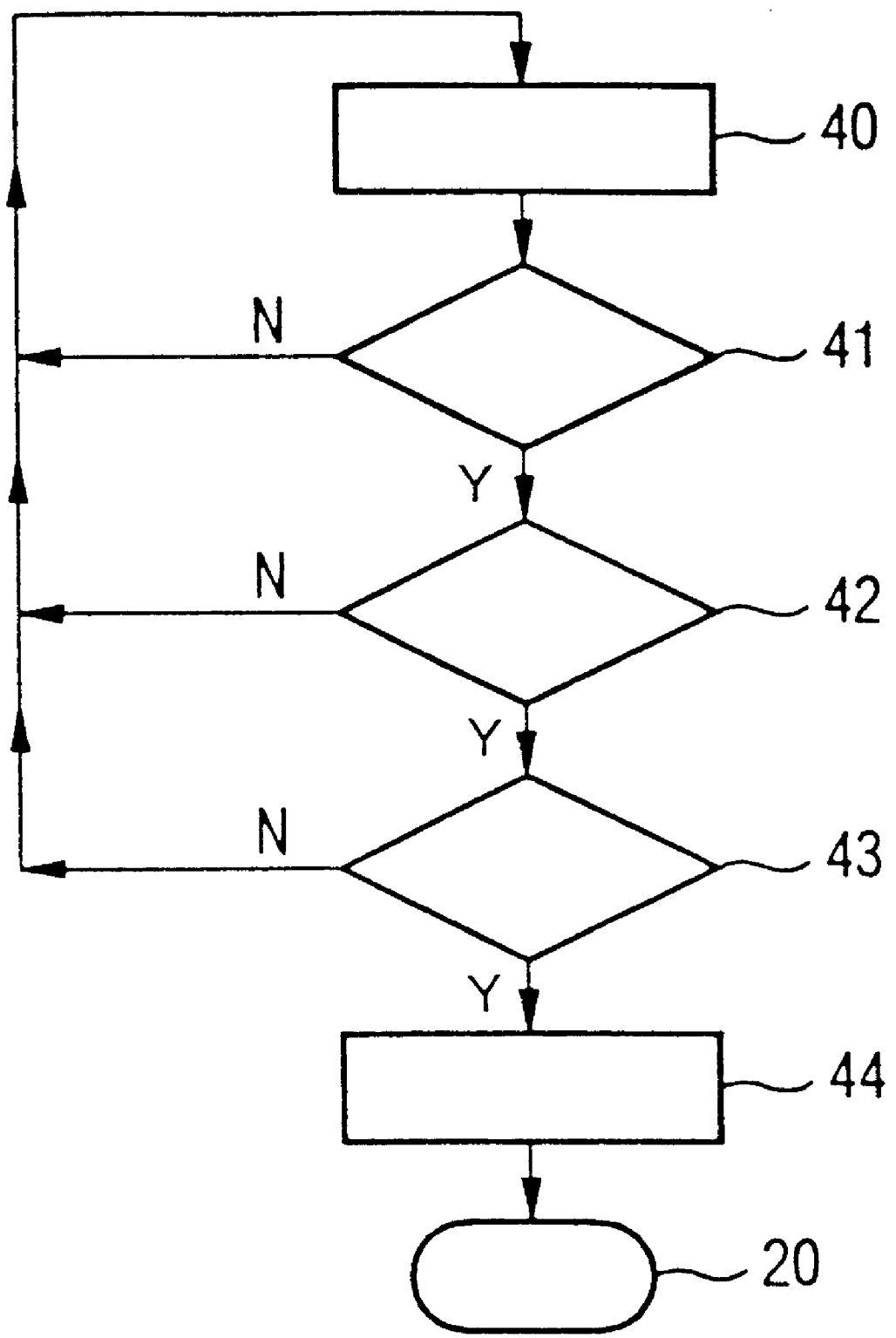
FIG. 6 is a program sequence for initializing a control unit.

FIG. 6 shows a starting operation for a motor vehicle, in which the arithmetic unit 2 carries out an initialization of the control unit 7. In a program point 40, the arithmetic unit 2 searches for the data block 12 of the memory region 9, 10, 11 having a counter 18 which has the highest block and which is thereafter called the current data block 12. Next, in a program point 41, the arithmetic unit 2 checks the plausibility detector 17 of the current data block 12 as to whether or not the plausibility detector 17 is set to valid or invalid. If the plausibility detector 17 has been set to invalid, then its counter 18 is set to zero, and a return is then made to the program point 40.

The resetting of the counter 18 assures that this data block will not be found again in the program point 40.

If the check of the plausibility detector 17 of the current data block 12 shows that the plausibility detector 17 has been set to valid, then in a program point 42 the counter 18 is compared with the redundant counter 19. If the comparison shows that the value of the counter 18 differs from the value of the redundant counter 19, then the counter 18 of the current data block 12 is likewise set to zero, and a return is then made to the program point 40.

If the checking of the checksum 14 shows that the adaptation data 8 have been stored correctly in memory, then in an ensuing program point 44 the adaptation data 8 of the current data block 12 are written into the first memory 4, and the control unit 7 controls the motor vehicle equipment with the adaptation data 8 written into the first memory 4. After the execution of the program point 44, a return is made to the program point 20.

As the operation of the control unit 7 continues, data, in particular adaptation data 8, are written continuously from the arithmetic unit 2 into the first memory 4.

Figure 4:
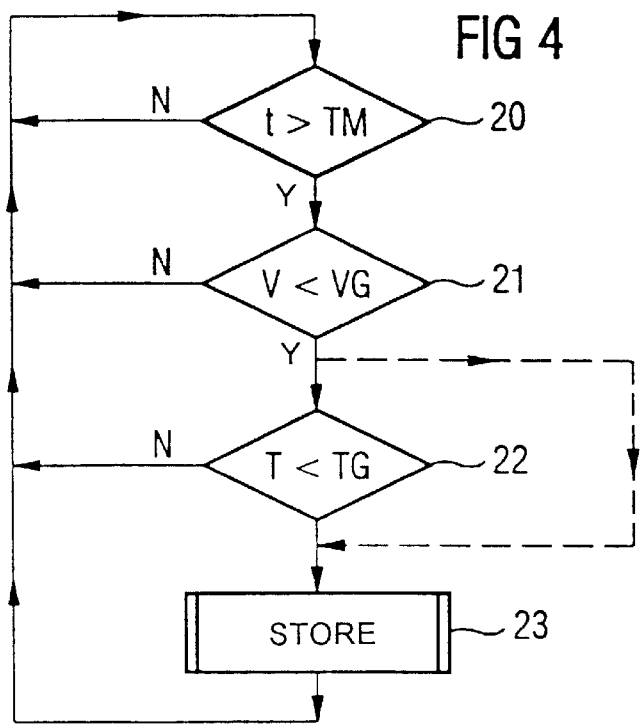
FIG. 4 is a program sequence for storing data in memory.

If after the initialization process the conditions of the program points 20, 21 or of the program points 20, 21 and 22 of FIG. 4 exist, then upon the first storage operation after the initialization, the adaptation data 8 of the first memory 4 are written into the memory region 9, 10, 11 of the second memory 5 having a plausibility detector 17 which is invalid. However, if there is no memory region 9, 10, 11 that has an invalid plausibility detector 17, then the adaptation data from the first memory 4 are written into the memory region 9, 10, 11 of the second memory 5 that has the oldest adaptation data 8, that is the one that has gone the longest since the last time that data were written into it.

If the check of the data blocks 12 of the memory regions 9, 10, 11 of the second memory 5 shows that no valid adaptation data 8 has been deposited in the second memory 5, then the basic data from the third memory 3 are written into the first memory 2, and the control unit 7 controls the motor vehicle equipment using the basic data. Although in this case the basic data do not represent the optimal data, nevertheless they are good enough to ensure that it is possible to control the equipment, and it is possible to ascertain adaptation data again that are deposited in the first memory and subsequently in the second memory 5.

The present invention has the advantage of reducing the storage operations of the data, especially the adaptation data, to one memory region 9, 10, 11 of a second memory 5, since the same memory region 9, 10, 11 is accessed only every third storage operation. In this way, the physical burden on individual memory regions 9, 10, 11 is reduced.

The number of storage operations is also reduced by providing that a predeterminable period of time must elapse between the storage operations, and that the speed of the motor vehicle must be below a predeterminable limit speed. For instance, when driving on the highway, where the speed is always above the limit speed, no storage of the adaptation data in memory will be carried out for hours at a time. In this way, the adaptation data 8 that were ascertained with high probability shortly before the motor vehicle was stopped and shut off are stored in the nonvolatile second memory 5, and thus represent the most current and most suitable adaptation data 8 for the next starting of the vehicle.

A storage of the adaptation data 8 in the second memory 5 is preferably performed only whenever the temperature of the second memory 5 is below the limit temperature, since the functional reliability of a storage operation in the second memory 5 drops as the temperature rises, and at an elevated temperature, preferably above 120° C., the risk of errors in individual EEPROM cells caused by a permanent defect increases.

The method described herein has been described in terms of three memory regions 9, 10, 11, but the method can also be employed when there are two or more than three memory regions 9, 10, 11. The limit temperature, limit speed, and predeterminable period of time TG should also be adapted by one skilled in the art in accordance with the conditions of use.

An economical embodiment of the invention is based on performing the storage operation with one data block 12 in only one memory region 9 of a second memory 5, and the physical burden on the single memory region is reduced by providing that a storage operation is performed only whenever the predeterminable period of time has elapsed and the limit speed is undershot, or if the predeterminable period of time is elaspsed and the limit speed is undershot and the temperature of the memory region is below the limit temperature.

I claim:

1. A method for storing data in memory, which comprises:
   reading the data out of first, volatile memory; and
   storing the data in a second, nonvolatile memory only if a vehicle in which the second memory is located is moving more slowly than a predeterminable speed.

2. The method according to claim 1, which comprises storing the data in alternation in a first memory region and in at least one second memory region of the second, nonvolatile memory.

3. The method according to claim 1, which comprises storing the data in cyclical order in the second memory.

4. The method according to claim 2, which comprises storing the data in the memory region which has not been written into for the longest time and thus has the oldest data.

5. The method according to claim 2, which comprises storing backup data in alternation with the data in the first or second memory region of the second memory, upon each storage operation for the data.

6. The method according to claim 2, which comprises incrementing a counter of the memory region in which the data has been stored to a value representing a highest value of a counter of the memory regions.

7. The method according to claim 2, which comprises:
   initializing a control unit by searching for the memory region of the second memory in which data have most recently been written and in which a check of backup data indicates a correct storage operation;
   writing the data of the memory region into the first memory; and
   using the data written into the first memory by the control unit for executing a control process.

8. The method according to claim 7, which comprises using a memory region having an invalid plausibility detector for the storage operation.

9. The method according to claim 7, which comprises writing the data into a memory region into which no data has been written for the longest time and which thus has the oldest adaptation data for the storage operation, if no memory region with an invalid plausibility detector is present.

10. The method according to claim 1, which comprises storing the data only after a predeterminable length of time has elapsed since the last storage operation.

11. The method according to claim 10, which comprises performing a storage operation only whenever a speed at which the second memory is moved is below a predeterminable limit speed.

12. The method according to claim 10, which comprises permitting a storage operation only if a temperature of the second memory is below a predeterminable limit temperature.

* * * * *